United States Patent
Oh et al.

(10) Patent No.: US 7,005,767 B2
(45) Date of Patent: Feb. 28, 2006

(54) SNAP-FIT COVERPLATE AND GEARHOUSING FOR ELECTRIC MOTOR

(75) Inventors: JonYeon Oh, Suwanee, GA (US); Barry Anderson, Suwanee, GA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 93 days.

(21) Appl. No.: 10/812,621

(22) Filed: Mar. 30, 2004

(65) Prior Publication Data

US 2005/0109155 A1  May 26, 2005

Related U.S. Application Data

(60) Provisional application No. 60/524,569, filed on Nov. 24, 2003.

(51) Int. Cl.
*H02K 5/22* (2006.01)
(52) U.S. Cl. ...................................................... 310/89
(58) Field of Classification Search ................. 310/89, 310/91, 75 R, 83, 98–99
See application file for complete search history.

(56) References Cited

U.S. PATENT DOCUMENTS

| | | | |
|---|---|---|---|
| 4,713,568 A | | 12/1987 | Adam et al. ................. 310/112 |
| 4,922,149 A | * | 5/1990 | Isozumi et al. ............... 310/89 |
| 5,864,188 A | | 1/1999 | Gerrand et al. ............... 310/71 |
| 5,914,549 A | * | 6/1999 | Adachi et al. ................ 310/89 |
| 6,163,096 A | | 12/2000 | Michenfelder et al. ...... 310/239 |
| 6,400,051 B1 | * | 6/2002 | Hsieh ........................... 310/89 |
| 6,717,321 B1 | * | 4/2004 | Mademba-Sy et al. ...... 310/239 |
| 6,727,613 B1 | * | 4/2004 | Kawakami et al. ......... 310/75 R |

FOREIGN PATENT DOCUMENTS

| | | |
|---|---|---|
| DE | 19813039 | 7/1999 |
| FR | 2783648 | 3/2000 |

OTHER PUBLICATIONS

Annex to Form PCT/ISA/206 Communication relating to the results of the partial International Search.

* cited by examiner

*Primary Examiner*—Tran Nguyen

(57) ABSTRACT

A coverplate 10 and gearhousing 22 are provided for an electric motor 23. The coverplate 10 includes loop structure 14 and the gearhousing includes guides 28 such that the loop structure engages with the guides in a snap-fit arrangement to secure the coverplate with respect to the gearhousing. The coverplate 10 includes locators 16 extending therefrom and the gearhousing 22 includes grooves 24 such that the locators 16 are received in the grooves 24 when the loop structure and guides are in the snap-fit arrangement so as to prevent rotation of the coverplate with respect to the gearhousing about an axis.

22 Claims, 2 Drawing Sheets

SNAP-FIT COVERPLATE AND GEARHOUSING FOR ELECTRIC MOTOR

This application is based on U.S. Provisional Application Ser. No. 60/524,569 filed on Nov. 24, 2003 and claims the benefit thereof for priority purposes.

BACKGROUND OF THE INVENTION

Conventional motors having a gearhousing, such vehicle windowlift motors use coverplates to enclose the gearhousing to prevent leakage therein from the external environment. The coverplates are either aluminum coverplates secured by screws or are molded plastic coverplates that are secured to a gearhousing by a press-fit arrangement. The use of screws adds parts and increases assembly time and thus increases cost. When an interference or press-fit is used, a complicated geometry is needed for the coverplate and cost is increased due to the need for many iterations of the tooling to ensure the proper interference fit between the coverplate and the gearhousing. The need for several iterations of the tooling by the toolmaker causes delay and customer displeasure.

There is a need to provide a coverplate easily fitted to a gearhousing of a motor in a cost-efficient manner.

SUMMMARY OF THE INVENTION

An object of the present invention is to fulfill the need referred to above. In accordance with the principles of the present invention, this objective is obtained by a providing a coverplate and gearhousing for an electric motor. One of gearhousing and coverplate includes loop structure and the other of the gearhousing and coverplate includes guides such that the loop structure engages with the guides in a snap-fit arrangement to secure the coverplate with respect to the gearhousing. In addition, one of the gearhousing and coverplate includes locators extending therefrom and the other of the gearhousing and coverplate includes grooves such that the locators are received in the grooves when the loop structure and guides are in the snap-fit arrangement so as to prevent rotation of the coverplate with respect to the gearhousing about an axis.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
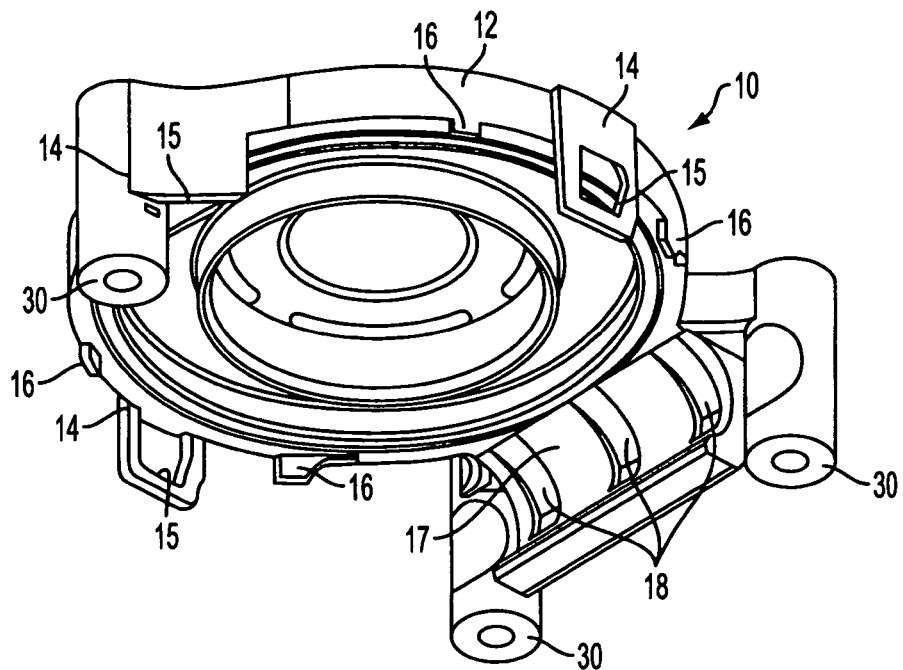
FIG. 1 is a perspective view of an underside coverplate for a gearhousing of a motor provided in accordance with the principles of the invention.

A coverplate for a motor is shown, generally indicated at 10, in FIG. 1 in accordance with the invention. The coverplate 10 has a main body 12. Loop structure 14 extends from the main body 12. In the embodiment, the loop structure includes at least a pair of enclosed loops 15 disposed on opposing sides of the main body 12 or in any other spaced relation. The function of the enclosed loops 15 will be explained below. Also, a plurality of locators 16 extends from a periphery of the main body 12. The underside 17 of the coverplate 10 includes a plurality of locating recesses 18 therein that are constructed and arranged to receive mating locators 20 that extend from a gearhousing 22 (FIG. 2), as explained below.

Figure 2:
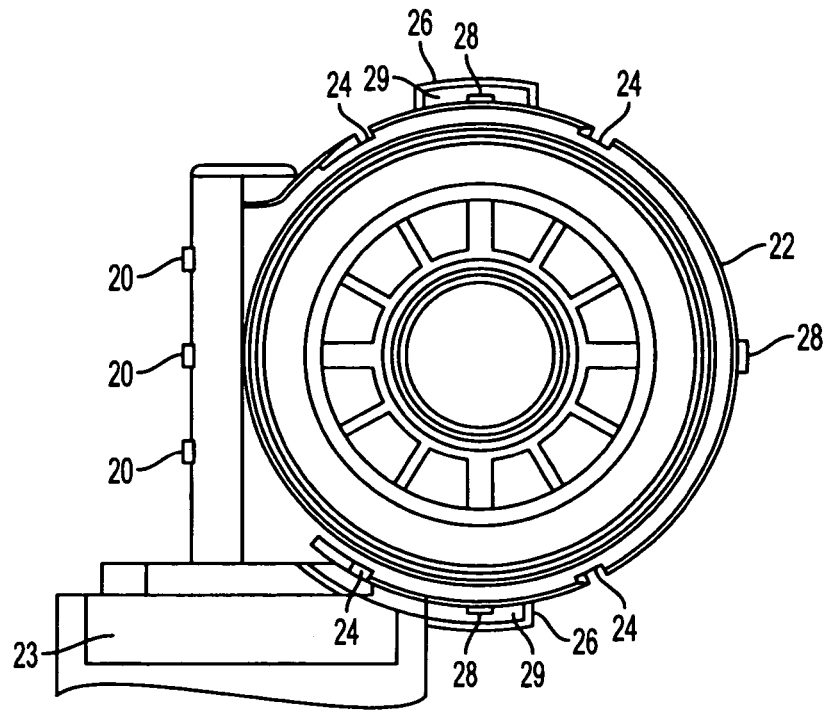
FIG. 2 is a top view of a gearhousing of the invention shown without the coverplate attached.
Figure 3:
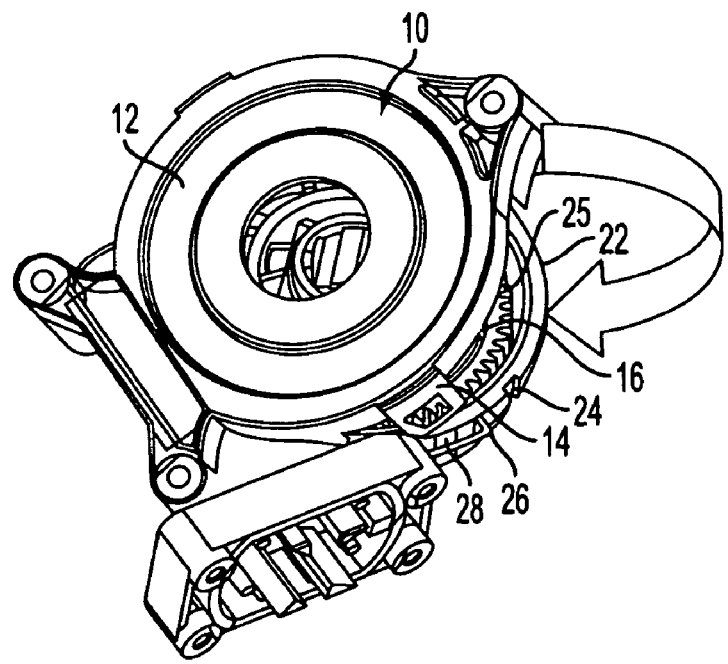
FIG. 3 is a view of the coverplate of the invention being coupled to the gearhousing.

As shown in FIG. 2, the gearhousing 22 is associated with the motor 23 and is constructed and arranged to contain gearing 25 (FIG. 3). The motor 23 is, for example, a conventional windowlift motor for a vehicle. The gearhousing 22 includes a plurality of grooves 24 in a periphery thereof that align with the plurality of locators 16 of the coverplate 10. The gearhousing 22 also includes a pair of guides 26 that align with the loop structure 14 of the coverplate 10. Each guide 26 defines a pocket 29 and each guide 26 includes a locking tab 28 extending within an associated pocket 29.

Figure 4:
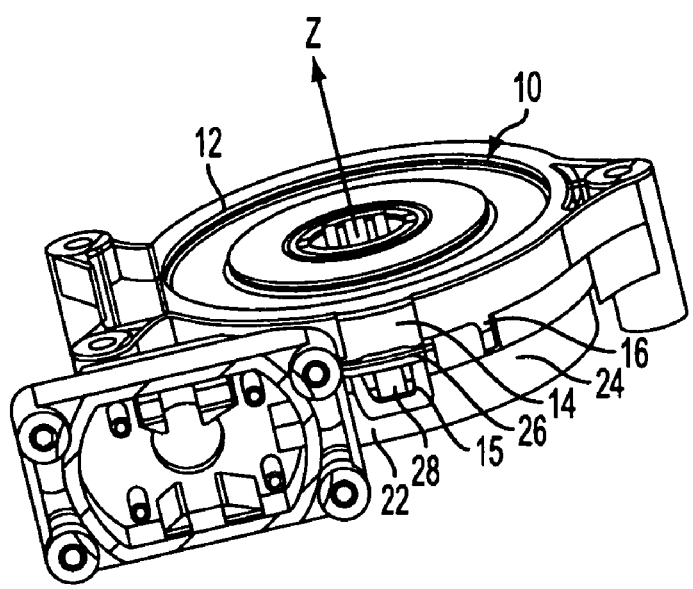
FIG. 4 is a view of the coverplate being in complete snap-fit arrangement with the gearhousing.

The locators 20 are in a linear arrangement along with the mating recesses 18. Thus, to assemble the coverplate 10 to the gearhousing 22, first, the locators 20 of the gearhousing 22 are fitted within the recess 18 of the coverplate 10 to define a hinge arrangement. Next, the coverplate 10 is rotated about this hinge arrangement and the loop structure 14 is inserted into the pockets 29 of the guides 26. Each locking tab 28 is received in an associated enclosed loop 15 of the loop structure 14. The locking tabs 28 limit movement of the coverplate 10 along the z-axis (FIG. 4) and thus secure the coverplate to the gearhousing 22 in a snap-fit arrangement. This assembly process is shown in FIGS. 3 and 4. The motor 23 is not shown in FIGS. 3 and 4.

When the coverplate 10 is completely assembled with the gearhousing 22 (FIG. 4) the locators 16 in grooves 24 prevent rotation of the coverplate with respect to the Z-axis. Once assembled, the coverplate 10 covers an open end of the gearhousing 22, protecting gearing inside the gearhousing 22 from the external environment.

The coverplate 10 can be molded from plastic. Thus, customer motor mounting bosses 30 can be integral with the coverplate 22, instead of being provided on the gearhousing as is typically done. This allows the mounting bosses 30 to be formed as a mold insert for the different customer mounting patterns. This reduces tooling cost and cycle time since new motors can be configured by reconfiguring the mounting bosses 30 on the coverplate 10, instead of on the more complicated gearhousing 22. Since the bosses 30 are on the coverplate 22, a universal gearhousing can be provided.

Thus, the invention provides a simple, generally round coverplate geometry that will snap into the gearhousing 22, eliminating the need for screws. The round shape of the coverplate 10 also reduces leakage issues. The coverplate 10 is easy to assembly, and since there is no interference fit as in the conventional assembly, cycle time for tooling corrections is reduced.

It can be appreciated that all of the mating parts of the coverplate/gearhousing assembly may be provided on the other member. For example, the grooves 24 can be provided on the coverplate 10 with the locators 16 provided on the gearhousing 22, the guides 26 can be provided on the coverplate 10 with the loop structure 14 on the gearhousing 22, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A coverplate and gearhousing for an electric motor including:
   a coverplate, and
   a gearhousing,
   wherein one of the gearhousing and coverplate includes loop structure and the other of the gearhousing and coverplate includes guides such that the loop structure engages with the guides in a snap-fit arrangement to secure the coverplate with respect to the gearhousing, and
   wherein one of the gearhousing and coverplate includes locators and the other of the gearhousing and coverplate includes recesses that mate with the locators to define a hinge arrangement.

2. The coverplate and gearhousing of claim 1, wherein the loop structure is provided on the coverplate and the guides are provided on the gearhousing.

3. The coverplate and gearhousing of claim 2, wherein the loop structure includes at least a pair of enclosed loops disposed in spaced relation on the coverplate and the gearhousing includes a pair of guides.

4. The coverplate and gearhousing of claim 3, wherein each guide defines a pocket and a locking tab extends into each pocket, with a locking tab being engaged with an associated enclosed loop when the coverplate and gearhousing are in the snap-fit arrangement.

5. The coverplate and gearhousing of claim 1, wherein the locators are in a linear arrangement on gearhousing and the recesses are in a linear arrangement in the coverplate.

6. The coverplate and gearhousing of claim 1, in combination with a motor, the motor being a windowlift motor for a vehicle.

7. The coverplate and gearhousing of claim 1, wherein the coverplate is molded from plastic and includes integral mounting bosses.

8. The coverplate and gearhousing of claim 1, wherein the coverplate is of generally round configuration.

9. The coverplate and gearhousing of claim 1, wherein one of the gearhousing and coverplate includes second locators extending therefrom and the other of the gearhousing and coverplate includes grooves such that the second locators are received in the grooves when the loop structure and guides are in the snap-fit arrangement so as to prevent rotation of the coverplate with respect to the gearhousing about an axis.

10. The coverplate and gearhousing of claim 9, wherein the second locators are provided on the coverplate and the grooves are provided in the gearhousing.

11. A coverplate and gearhousing for an electric motor including:
    a coverplate, and
    a gearhousing,
    wherein one of the gearhousing and coverplate includes guide means and the other of the gearhousing and coverplate includes means for engaging with the guide means in a snap-fit arrangement to secure the coverplate with respect to the gearhousing, and
    wherein one of the gearhousing and coverplate includes means for locating and the other of the gearhousing and coverplate includes means for mating with the means for locating to define a hinge arrangement.

12. The coverplate and gearhousing of claim 11, wherein the means for engaging is provided on the coverplate and the guide means is provided on the gearhousing.

13. The coverplate and gearhousing of claim 12, wherein the means for engaging includes at least a pair of enclosed loops disposed in spaced relation on the coverplate and the gearhousing includes pair of guides defining the guide means.

14. The coverplate and gearhousing of claim 13, wherein each guide defines a pocket and a locking tab extends into each pocket, with a locking tab being engaged with an associated enclosed loop when the coverplate and gearhousing are in the snap-fit arrangement.

15. The coverplate and gearhousing of claim 11, wherein the means for locating are in a linear arrangement on the gearhousing and the means for mating includes recesses in a linear arrangement in the coverplate.

16. The coverplate and gearhousing of claim 11, in combination with a motor, the motor, the motor being a windowlift motor for a vehicle.

17. The coverplate and gearhousing of claim 11, wherein the coverplate is molded from plastic and includes integral mounting bosses.

18. The coverplate and gearhousing of claim 11, wherein the coverplate is of generally round configuration.

19. The coverplate and gearhousing of claim 11, wherein one of the gearhousing and coverplate includes second means for locating extending therefrom and the other of the gearhousing and coverplate includes means for receiving the second means for locating when the guide means and means for engaging are in the snap-fit arrangement, so as to prevent rotation of the coverplate with respect to the gearhousing about an axis.

20. The coverplate and gearhousing of claim 19, wherein the second means for locating is provided on the coverplate and the means for receiving is provided in the gearhousing.

21. A coverplate and gearhousing for an electric motor including:
    a gearhousing for containing gearing of the motor, the gearhousing having an open end, and
    a coverplate connected with the gearhousing so as to cover the open end, the coverplate including mounting bosses integral therewith for mounting the motor,
    wherein one of the gearhousing and coverplate includes locators and the other of the gearhousing and coverplate includes recesses that mate with the locators to define a hinge arrangement.

22. The coverplate and gearhousing of claim 21, wherein the coverplate and gearhousing are constructed and arranged to be connected in snap-fit arrangement.

* * * * *